(12) United States Patent
Taank et al.

(10) Patent No.: US 9,563,705 B2
(45) Date of Patent: Feb. 7, 2017

(54) RE-RANKING RESULTS IN A SEARCH

(71) Applicant: Wal-Mart Stores, Inc., Bentonville, AR (US)

(72) Inventors: Sumit Taank, San Jose, CA (US); Tri Minh Cao, San Bruno, CA (US); Abhishek Gattani, Sunnyvale, CA (US)

(73) Assignee: WAL-MART STORES, INC., Bentonville, AR (US)

( * ) Notice: Subject to any disclaimer, the term of this patent is extended or adjusted under 35 U.S.C. 154(b) by 271 days.

(21) Appl. No.: 13/847,983

(22) Filed: Mar. 20, 2013

(65) Prior Publication Data

US 2014/0289210 A1    Sep. 25, 2014

(51) Int. Cl.
*G06F 7/00* (2006.01)
*G06F 17/30* (2006.01)

(52) U.S. Cl.
CPC .............. *G06F 17/30864* (2013.01)

(58) Field of Classification Search
CPC ............ G06F 17/30867; G06F 17/30864; G06F 17/30386; G06F 17/30675; G06N 99/005
USPC ............................. 707/706, 723, 728
See application file for complete search history.

(56) References Cited

U.S. PATENT DOCUMENTS

| 5,787,230 | A | 7/1998 | Lee |
| 7,979,427 | B2 | 7/2011 | McKeeth |
| 8,645,362 | B1 * | 2/2014 | Jain et al. ................. 707/723 |
| 9,081,857 | B1 * | 7/2015 | Huet et al. |
| 2013/0311408 | A1 * | 11/2013 | Bagga et al. ................. 706/12 |
| 2014/0052718 | A1 * | 2/2014 | Waupotitsch et al. ........ 707/728 |

\* cited by examiner

*Primary Examiner* — Md. I Uddin
(74) *Attorney, Agent, or Firm* — Bryan Cave LLP

(57) ABSTRACT

The present disclosure is directed to positioning a new item in search results that may additionally include previously-released items. Items in a search result may be ranked by popularity scores. In embodiments of the present disclosure, a new item may receive a popularity score boost to compensate for that item's relative lack of history in comparison to the previously-released items. Embodiments of the present disclosure utilize outside data sources to rank the items. Outside data sources may include social media, knowledge bases, and like platforms to leverage available outside data to complement internal data.

12 Claims, 7 Drawing Sheets

RE-RANKING RESULTS IN A SEARCH

BACKGROUND

A search engine typically comprises software code that is implemented to search for information and return search results to a user that submitted a search query. A search engine may attempt to return results most relevant to the user's search query by processing potential search results in a ranking algorithm. Results may be transmitted to the user and displayed in a ranked list. Typically, one or more signals used by ranking algorithms may correspond to an item's past popularity. When a new item is introduced to the search engine database, there are no corresponding popularity signals and as a result, the search engine may be naturally biased against newer items.

BRIEF DESCRIPTION OF THE DRAWINGS

Non-limiting and non-exhaustive embodiments of the present disclosure are described with reference to the following figures, wherein like reference numerals refer to like parts throughout the various views unless otherwise specified.

Figure 1:
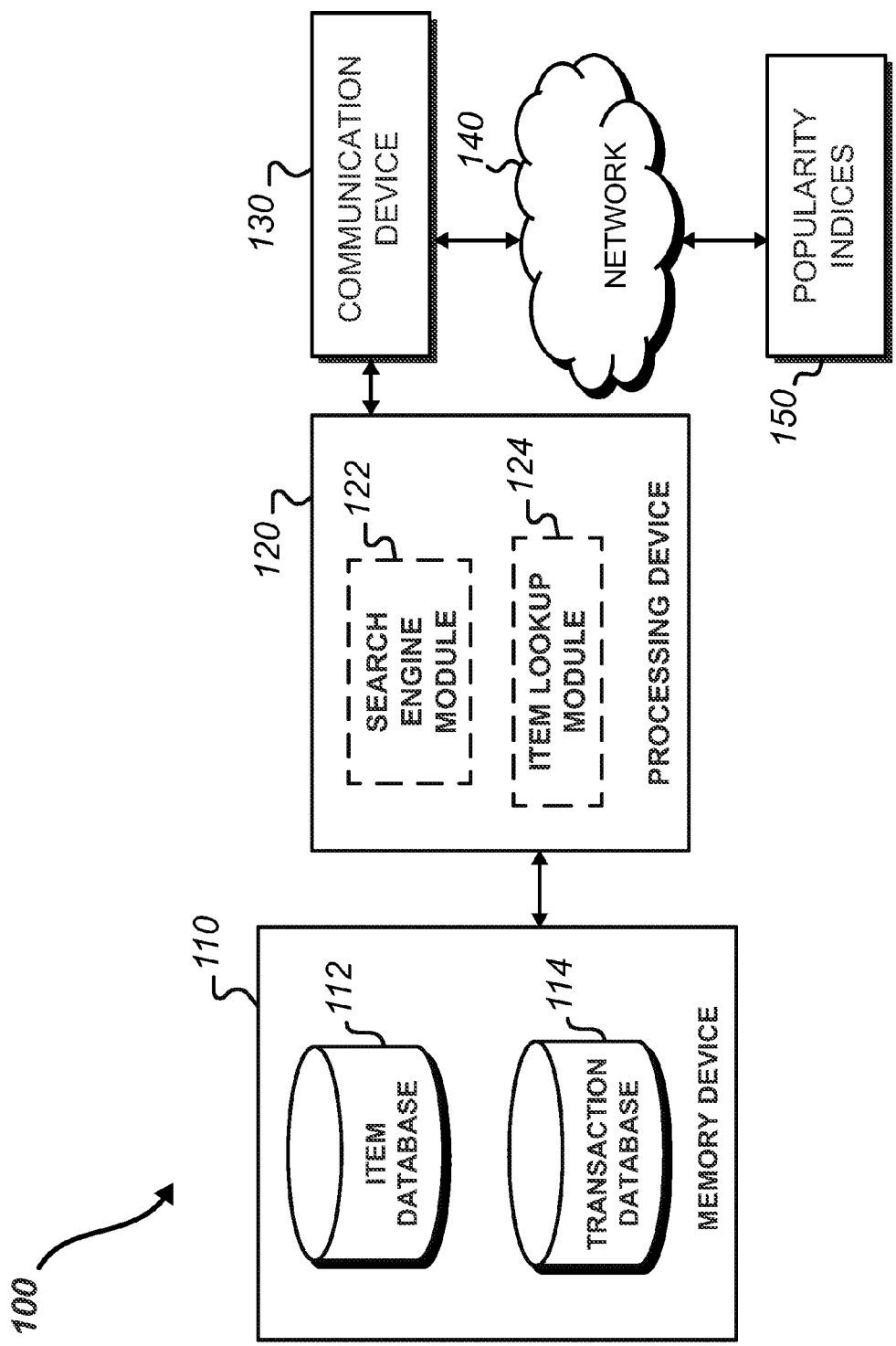
FIG. 1 is a block diagram illustrating components of a search ranking system according to an embodiment of the present disclosure.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present disclosure. Also, common but well-understood elements that are useful or necessary in a commercially feasible embodiment are often not depicted in order to facilitate a less obstructed view of these various embodiments of the present disclosure.

DETAILED DESCRIPTION

The present disclosure is directed to methods, systems, and computer programs for positioning an item in search results. In the following description, reference is made to the accompanying drawings that form a part hereof, and in which is shown by way of illustration specific exemplary embodiments in which the disclosure may be practiced. These embodiments are described in sufficient detail to enable those skilled in the art to practice the concepts disclosed herein, and it is to be understood that modifications to the various disclosed embodiments may be made, and other embodiments may be utilized, without departing from the spirit and scope of the present disclosure. The following detailed description is, therefore, not to be taken in a limiting sense.

Reference throughout this specification to "one embodiment," "an embodiment," "one example," or "an example" means that a particular feature, structure, or characteristic described in connection with the embodiment or example is included in at least one embodiment of the present disclosure. Thus, appearances of the phrases "in one embodiment," "in an embodiment," "one example," or "an example" in various places throughout this specification are not necessarily all referring to the same embodiment or example. Furthermore, the particular features, structures, or characteristics may be combined in any suitable combinations and/or sub-combinations in one or more embodiments or examples. In addition, it should be appreciated that the figures provided herewith are for explanation purposes to persons ordinarily skilled in the art and that the drawings are not necessarily drawn to scale.

Embodiments in accordance with the present disclosure may be embodied as an apparatus, method, or computer program product. Accordingly, the present disclosure may take the form of an entirely hardware-comprised embodiment, an entirely software-comprised embodiment (including firmware, resident software, micro-code, etc.), or an embodiment combining software and hardware aspects that may all generally be referred to herein as a "circuit," "module," or "system." Furthermore, embodiments of the present disclosure may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. Computer program code for carrying out operations of the present disclosure may be written in any combination of one or more programming languages. Such code may be compiled from source code to computer-readable assembly language or machine code suitable for the device or computer on which the code will be executed Embodiments may also be implemented in cloud computing environments. In this description and the following claims, "cloud computing" may be defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction and then scaled accordingly. A cloud model can be composed of various characteristics (e.g., on-demand self-service, broad network access, resource pooling, rapid elasticity, and measured service), service models (e.g., Software as a Service ("SaaS"), Platform as a Service ("PaaS"), and Infrastructure as a Service ("IaaS")), and deployment models (e.g., private cloud, community cloud, public cloud, and hybrid cloud).

The flowchart and block diagrams in the attached figures illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

Embodiments of the present disclosure are directed to positioning a relatively new item in search results that include previously-released items. Embodiments include compensation for item newness relative to other items in the search results. Compensation for item newness may be provided to re-rank a new item in the search results based on item nascency, metrics of related items, apparent popularity of the item from social network tags or like indicia, and other signals that may indicate the popularity and/or potential popularity of the new item. As used in the present disclosure, an "item" may refer to a product and/or service provided by a merchant. Such products may include, but are not limited to: groceries, foods, office supplies, clothing wares, any other fungible goods sold by a retailer, commercial products, industrial goods, and the like. Services may include, but are not limited to: professional services, financial services, medical services, business services, educational services, travel, lodging services, repair services, and other types of services. In general, a provider of products and/or services may be referred to herein as a merchant. A merchant may typically operate and manage the systems disclosed and described herein or may enter into service agreements with a third party to operate and manage the systems.

Referring now to FIG. 1, search ranking system 100 of the present disclosure comprises a memory device 110, processing device 120, and communication device 130. Memory device 110 comprises item database 112 and transaction database 114. Processing device 120 comprises search engine module 122 and item lookup module 124. Search ranking system 100, memory device 110, item database 112, transaction database 114, processing device 120, search engine module 122, item lookup module 124, and/or communication device 130 may refer to one or more servers or other type of computing devices that operate in an individual or distributed manner as will be described in detail below.

In embodiments, item database 112 is adapted to store item identifier codes, item popularity scores, data related to item tags in social networks, and other data that may be potentially indicative of an item's popularity. In embodiments, data stored in item database 112 can additionally include item category, on-sale date and other sales-related data, identity of related items, social network score, and additional information pertaining to the item as will be described in further detail. Item database 112 can receive queries from search engine module 122 and return identifiers for items that best fit the search parameters. In embodiments, transaction database 114 comprises a record of transactions effected by the merchant. Such transaction data may indicate item purchase frequency or other data indicative of an item's popularity. Transaction database 114 may include information related to an item purchase price, purchase locations, consumer purchasing habits, and other like data.

In embodiments, search engine module 122 is adapted to receive a user search query, execute a search based on the query, and return one or more results relevant to the query. A user search query may be submitted at user interfaces in a merchant software application installed on a mobile computing device (which may generally be referred to as an "app"), in a web browser on merchant's website, or by other similar means. In embodiments, the results returned by search engine module 122 may include one or more items. Search engine module 122 can query item database 112 with portions of the user search query and receive item identifiers for items that may fit the search parameters. Search engine module 122 is adapted to query item lookup module 124 with item identifiers and receive an item popularity score in return. Search engine module 122 can rank items according to the item popularity score for each item and return a list of items to the user.

Item lookup module 124 is adapted to receive item queries from search engine module 112 and return corresponding item popularity scores. Item lookup module 124 can calculate item scores based on an item's predicted and/or observed popularity. In embodiments, item lookup module 124 can modify an item score to compensate for a recently-introduced item's lack of history in comparison to other items, as will be described in further detail. Item lookup module 124 can search popularity indices 150 to determine an item's popularity. As used herein, popularity indices 150 refers to one or more outside data sources, including social networks, that include structured and/or unstructured data regarding one or more items. In an embodiment, one example of a popularity index 150 comprises a blogging or microblogging service such as Twitter. In embodiments, item lookup module 124 can search Twitter messages for words or tags that mention or correspond to an item, and calculate or modify a popularity score for that item according to the number and/or quality of tags and mentions. In another embodiment, an example of a popularity index 150 comprises a collaborative knowledge base such as Wikipedia or Freebase. Item lookup module 124 can search such collections for data regarding one or more items and calculate or modify a popularity score for that item according to the relevant data identified. Item lookup module 124 may access popularity indices 150 via communication device 130 and network 140.

Communication device 130 is adapted to transmit computer-readable instructions and data over network 140 to other computer systems as directed by the processing device 120. As used in the present disclosure, "network" 140 can refer to any communication network including, but not limited to, a wireless network, a cellular network, an intranet, the Internet, or combinations thereof. Communication device 130 can communicate with computing devices used by users to input data and/or receive outputs from system 100. Such user computing devices may comprise personal computers, handheld devices, tablet devices, or other like electronic devices. In embodiments, computing devices store application-specific software installed thereon and adapted to communicate with system 100. In alternative embodiments, operations described herein are effected through web browsers via graphical user interfaces adapted to collect and display information as directed by processing device 120. In embodiments, communication device 140 is adapted to communicate with other systems operated by the merchant to effect user search queries as set forth herein.

In operation, search ranking system 100 is adapted to determine a search result item's popularity score by analyzing: the newness of the item, the popularity of other items similar to the search result item, the quantity and/or quality of social network tags related to the search result item, and other data sources as will be described in further detail. The popularity score may reflect a prediction or estimate of the item's popularity and relevancy to the submitted search query. In embodiments, the popularity score may be used to rank the items for the search results transmitted and presented to the user. In embodiments, an item popularity score may reflect how many times an item has been searched for, purchased, mentioned in social media, or the like.

Figure 2:
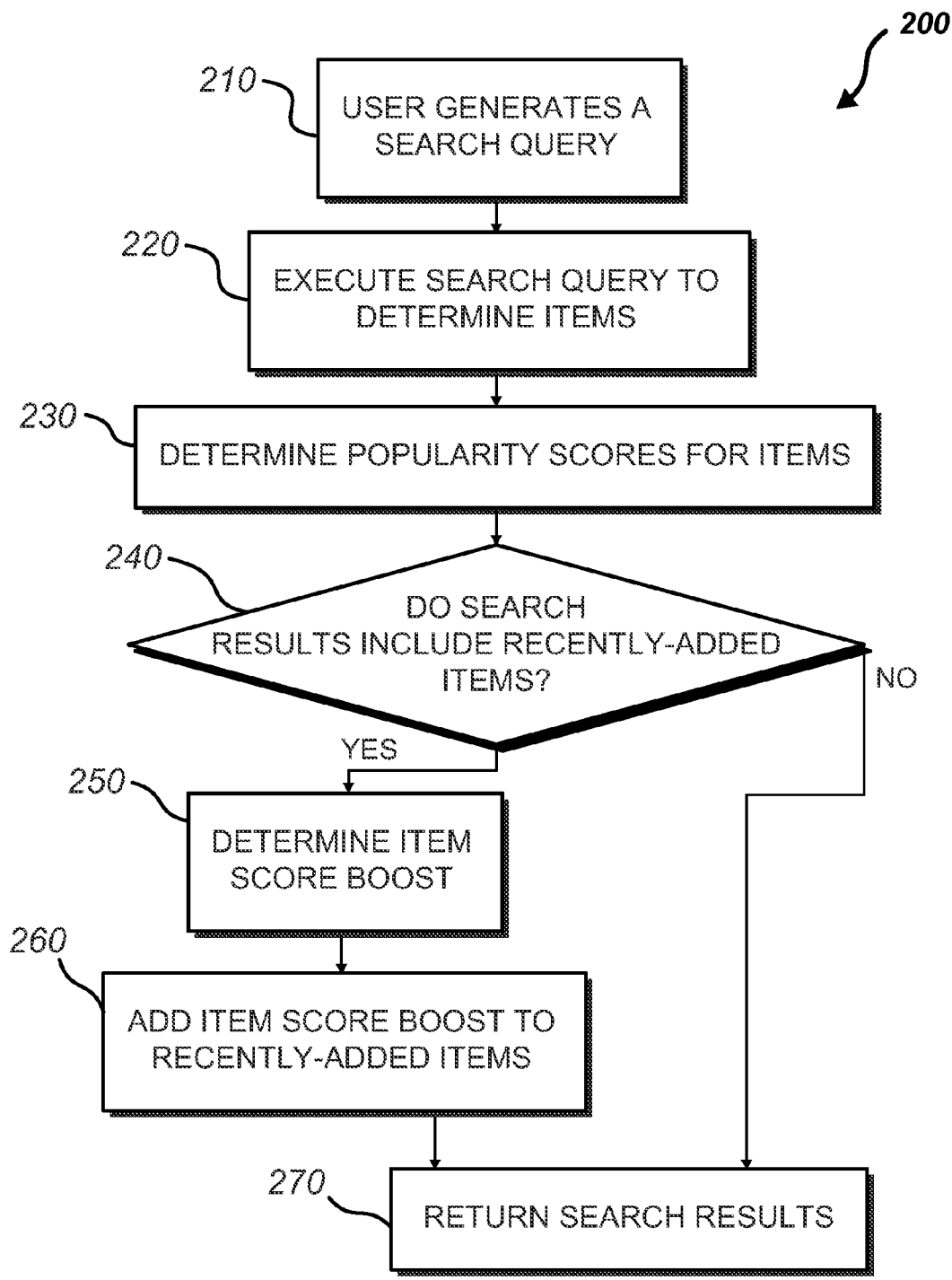
FIG. 2 is a flow chart illustrating an example method for executing a search in accordance with embodiments of the present disclosure.

Referring now to FIG. 2, a method 200 for executing a search according to embodiments of the present disclosure is illustrated. At operation 210, a search query is generated and sent by a user. The search query may be transmitted via network 140 to processing device 120 and received by search engine module 122. A typical search query may comprise a text string including one or more items of interest to the user. In embodiments, a search query comprises multi-faceted data such as item category, brand, or other item-related selections made by a user. At operation 220, search engine module 122 executes a search on the search query to identify items relevant to the query. Search engine module 122 is adapted to query item database 112 and receive item identifiers corresponding to the search string. In embodiments, item database 112 comprises a product database of products that the merchant offers for sale. In such an embodiment, the search query may comprise words identifying one or more products by keyword or other descriptors and the search engine module 122 may receive product identifiers by querying item database 112 with the search query. At operation 240, search engine module 112 receives respective popularity scores for each item returned from item database 112.

At operation 240, search engine module 122 queries item lookup module 124 to determine which, if any, items in the search results represent a recently-added item. In an embodiment, item lookup module 124 may determine if an item is new by querying item database 112 for the on-sale date of that item or other indicators of an item age of the item. As used herein, an "item age" may refer to the time between a current time and the first time where an item was offered for sale, placed into an item database, or otherwise introduced by the merchant or other entity. A nascency threshold may selectively be instituted such that if an item introduction date indicates that the item age is greater than the nascency threshold, then the item is no longer a recently-added item. As an example, a nascency threshold may be set at six months. Accordingly, an item that has been sold for less than six months may be deemed to be a recently-added item. In embodiments, item lookup module 124 may determine if an item is new by querying transaction database 114, identifying the oldest transaction for the item, equating the time since that transaction as the item age, and comparing the item age against the nascency threshold to determine if the item is a recently-added item. In alternate embodiments, item lookup module 124 can determine an item age by querying external or other databases or knowledge bases such as Freebase and the like. In embodiments, item lookup module 124 can determine if any items are new by following methods described in further detail and depicted in FIG. 4.

At operation 250, if item lookup module 124 identified any recently-added items in the search results, item lookup module 124 can then calculate an item score boost for each new item. In embodiments, an item score boost may be determined by factoring the item age, category, number of social media tags, popularity of related items, and other like factors as will be described in further detail. At operation 260, item lookup module 124 adds the item score boost to the item's popularity score to result in an adjusted popularity score, which may then be transmitted back to search engine module 122. At operation 270, search engine module 122 returns ranked search results to the user. The results may be ranked in descending order of adjusted popularity score.

Figure 3:
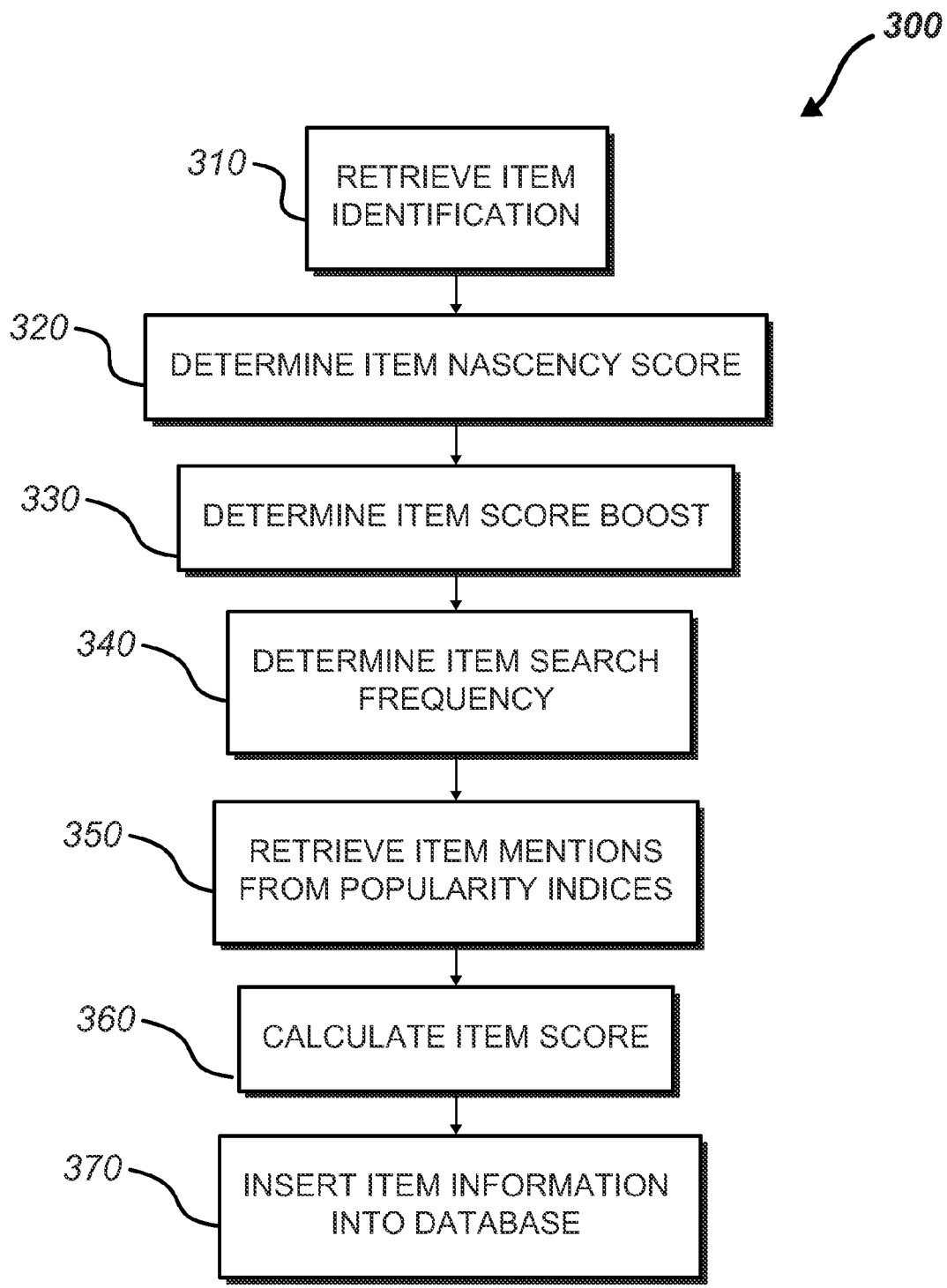
FIG. 3 is a flow chart illustrating an example method for constructing an item database in accordance with embodiments of the present disclosure.

Referring now to FIG. 3, a method 300 for building and/or augmenting an item database according to embodiments of the present disclosure is illustrated. The method 300 may result in an item database 112 that is populated with items and corresponding adjusted popularity scores that compensate for item nascency. At operation 310, item lookup module 124 receives an item identifier that represents an item to be queried and/or added to item database 112. At operation 320, item lookup module 124 determines item nascency score of the item under consideration. In embodiments, an item nascency score comprises a compensating adjustment to an item popularity score, the adjustment being related to the age and category of the item and/or additional factors. In particular, a recently-introduced item that does not yet have an established popularity score may receive a greater popularity score adjustment than an item that has a demonstrated history reflecting its popularity. An item nascency score may be compared against a nascency threshold to determine if the item qualifies as a "new" item.

At operation 330, item lookup module 124 determines an item score boost to the item popularity score. In embodiments, an item score boost is applied to items that qualified as a "new" item. The item score boost may be equivalent to the item nascency score, such that newer items having a larger nascency score may receive a larger score boost. In other embodiments, an item nascency score acts as a multiplier, such that items of various ages may receive a score boost, but new items receive a larger score boost.

At operation 340, item lookup module 124 queries item database 112 to determine item search frequency. In embodiments, item search frequency is a value stored in item database 112 to reflect how often users searched for that item, thus reflecting the potential popularity of the item. At operation 350, item lookup module 124 queries popularity indices 150 to tabulate the quantity and/or quality of mentions or tagged content relating to the item. In embodiments, popularity indices 150 may include Twitter, Freebase, Facebook, or other social media and/or knowledge base platforms. Item lookup module 124 can search for item mentions by keyword, or by specific item-related tags to find relevant mentions. Item lookup module 124 may ascertain the quality of item mentions by analyzing context or other clues that may indicate if an item mention comprises a positive indication.

At operation 360, item lookup module 124 calculates the item popularity score based on the item search frequency, popularity indices, item nascency score, and item score boost. At operation 370, the calculated item popularity score is inserted into the item database 112. In embodiments, method 300 may be periodically repeated to update an item popularity score in item database 112 as various circumstances change.

Figure 4A:
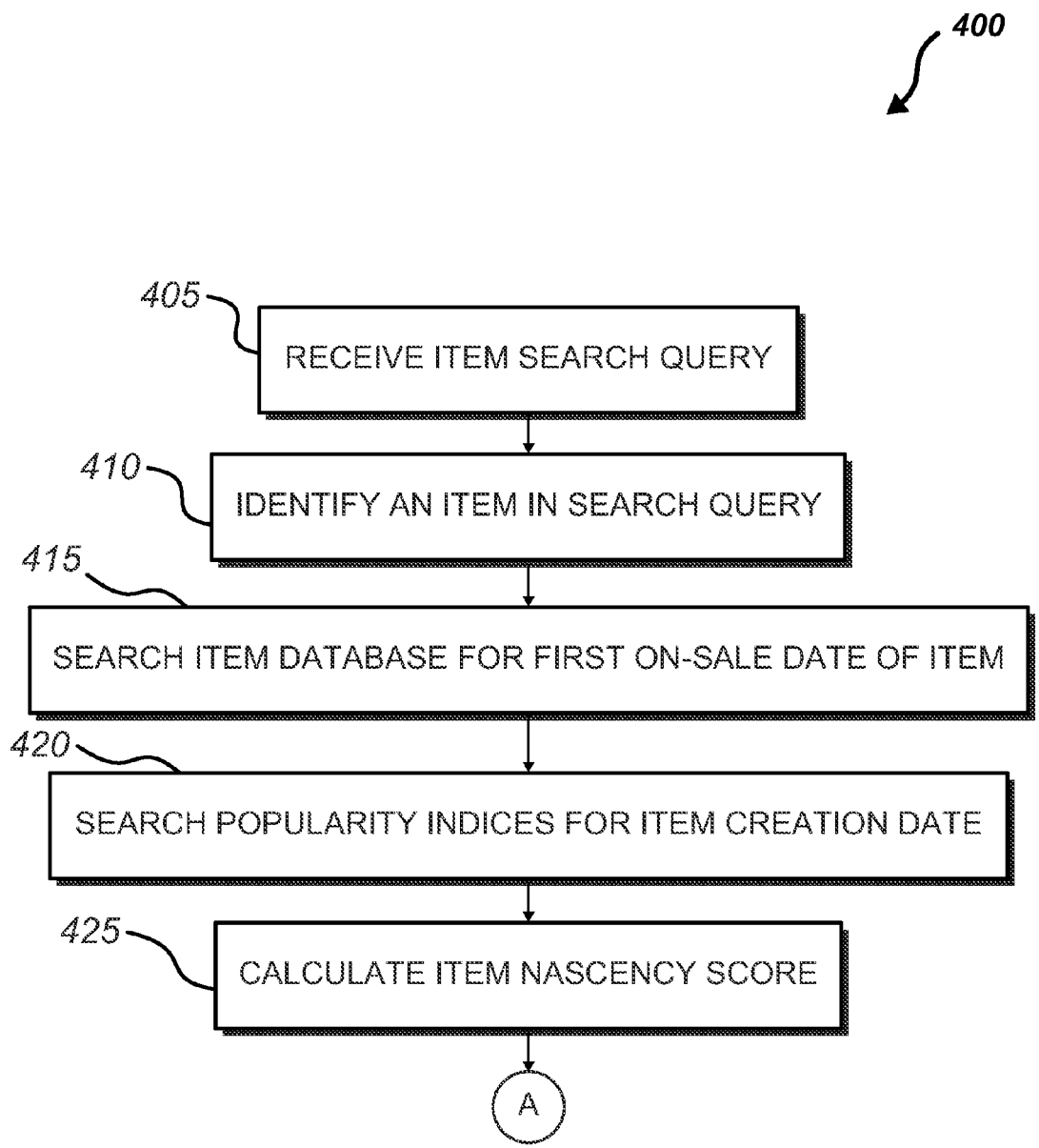
FIGS. 4A and 4B are a flow chart illustrating an example method for determining an item nascency score in accordance with embodiments of the present disclosure.
Figure 4B:
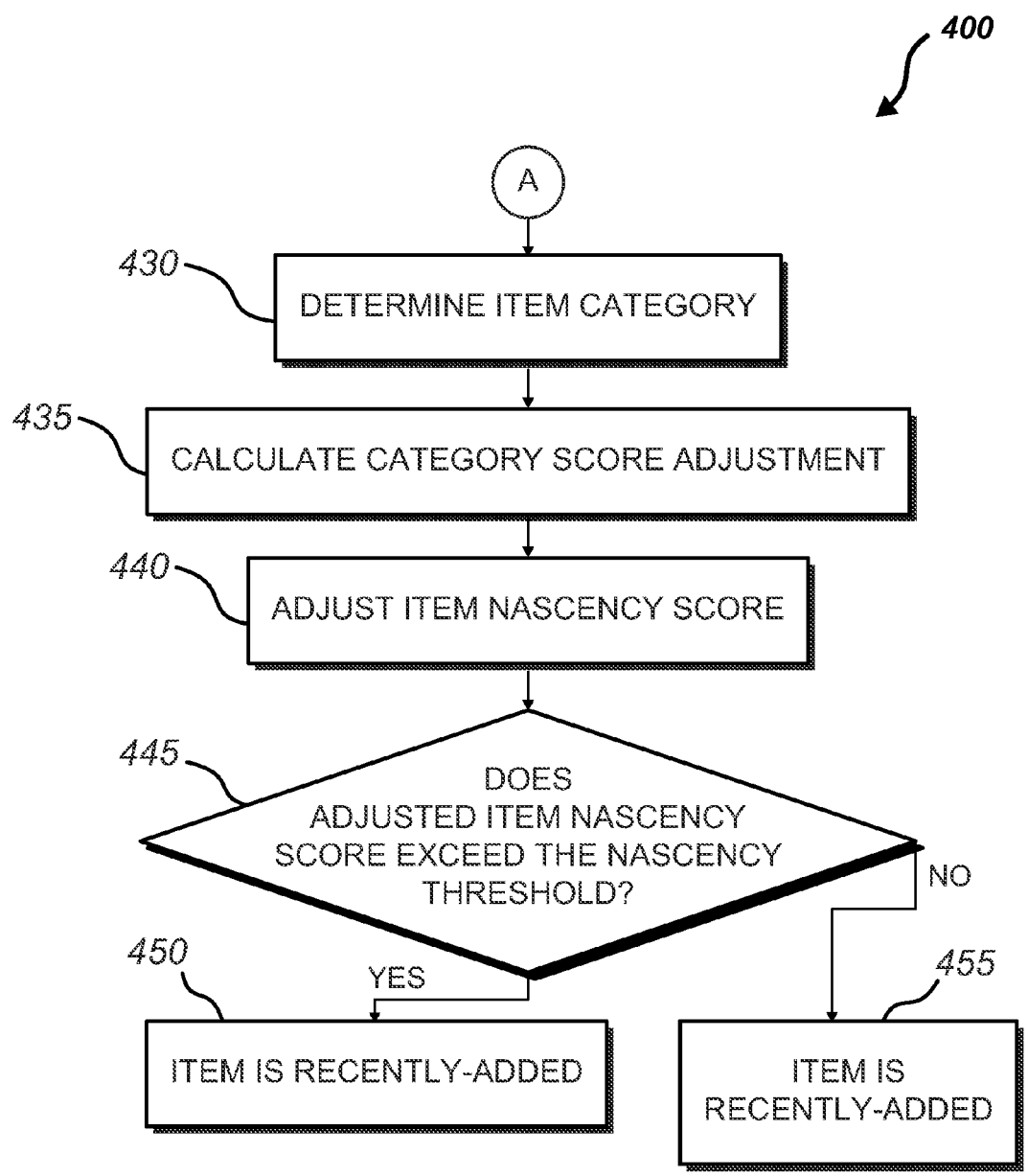

Referring now to FIGS. 4A and 4B, a method 400 for determining if an item is recently-added according to embodiments of the present disclosure is illustrated. At operation 405, search engine module 122 receives an item search query from a user. At operation 410, search engine module 122 parses the item search query to identify an item mentioned in the search query. At operation 415, item lookup module 124 queries item database 112 for the earliest on-sale date of the item to determine the item age. In alternate embodiments, item lookup module 124 can determine item age by searching transaction database 114. At operation 420, item lookup module 124 searches popularity indices 150 to attempt to ascertain the date on which the item was initially offered for sale, placed into an item database, or otherwise introduced by the merchant or other entity. At operation 425, item lookup module 124 uses the item introduction date to calculate the item nascency score. In embodiments, the item nascency score comprises a number on a predetermined arbitrary scale that represents the item's relative nascency in a market.

At operation 430, item lookup module 124 determines one or more categories that describe the item. In embodiments, item lookup module 124 queries item database 112 for the item category. At operation 435, item lookup module 124 calculates a category score adjustment to the item nascency score based on the item category and/or item age. Certain categories or types of items may be more sensitive to item nascency; the nascency score of such items may be alternately normalized to reflect such an item category or type. For example, media items such as books and movies may be highly susceptible to the effects of product nascency in search results. Accordingly, a nascency score for media items may receive a greater adjustment for a new product than a nascency score for an item in another category. At operation 440, item lookup module 124 adjusts the item nascency score by the calculated category score adjustment.

At operation 445, item lookup module 124 compares the item nascency score to the nascency threshold to determine if the item qualifies as a recently-added item. The nascency threshold may selectively be instituted accordingly to particular items or the preferences and criteria of the merchant. In embodiments, the nascency threshold may selectively be varied for each item, each category of item, or the like. At operation 450, if the item nascency score exceeded the nascency threshold, the item is deemed to be recently-added. At operation 455, if the nascency threshold is not exceeded, the item is deemed to not be recently-added.

Figure 5A:
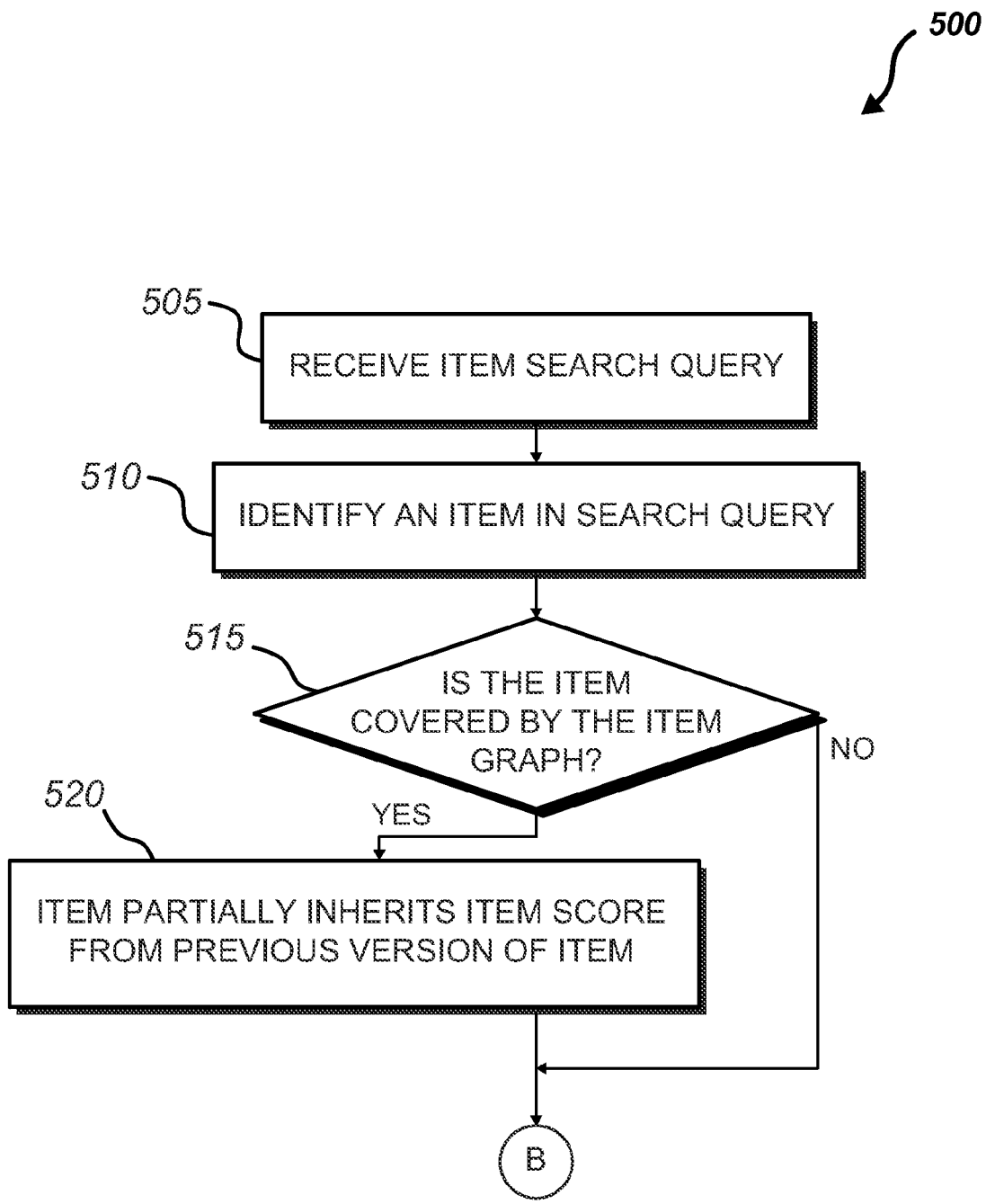
FIGS. 5A and 5B are a flow chart illustrating an example method for determining a new item score boost in accordance with embodiments of the present disclosure.
Figure 5B:
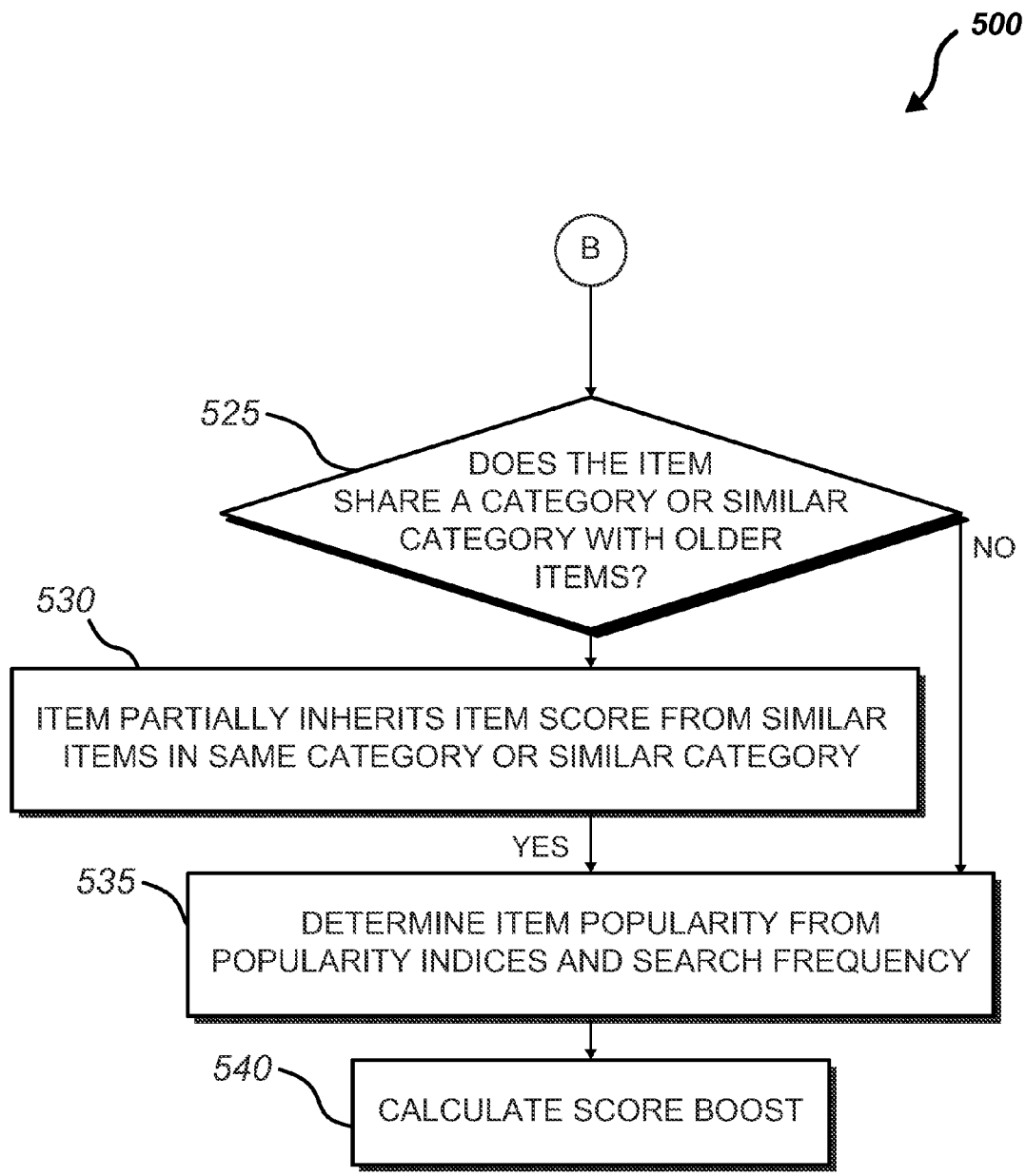

Referring now to FIGS. 5A and 5B, a method 500 for determining an item score boost according to embodiments of the present disclosure is illustrated. At operation 505, search engine module 122 receives a search query for an item from a user. At operation 510, search engine module 122 parses the search query string to identify one or more items in the search query.

At operation 515, item lookup module 124 determines if the item is covered by the item graph. In the present disclosure the item graph may refer to the item database 112 or other database holding data regarding an item. If an item is covered by the item graph, then the item or a related item may already have a popularity score recorded in item database 112. As used herein, a related item may comprise an older item that is a previous version of the item or older items that fall in the same category of the item and are similar enough that the popularity score of the older item may be indicative of the potential popularity of the newer item. At operation 520, if the item is covered by the item graph, the item partially inherits the popularity score from the previous version of the item. At operation 525, item lookup module 124 determines if the item shares a category or has a similar category with one or more older items that already have a popularity score. At operation 530, if the item shares a category or similar category, the item may partially inherit the popularity score from one or more similar items in the same category or a similar category.

At operation 535, item lookup module 124 determines the item popularity score by examining popularity indices 150, search frequency, and other indicia of an item popularity. Item lookup module 124 can search through Twitter messages, Freebase data, other social media mentions and/or tags, and the like to determine an item's popularity. Additional indicia of item popularity may include purchase frequency.

At operation 540, item lookup module calculates the item score boost by incorporating item popularity score with any inherited popularity scores. In alternative embodiments, item nascency score is incorporated into item popularity score boost. In other embodiments, item nascency score is used only as a threshold determination as described above.

Although the present disclosure is described in terms of certain preferred embodiments, other embodiments will be apparent to those of ordinary skill in the art, given the benefit of this disclosure, including embodiments that do not provide all of the benefits and features set forth herein, which are also within the scope of this disclosure. It is to be understood that other embodiments may be utilized, without departing from the spirit and scope of the present disclosure.

What is claimed is:

1. A computer-implemented method of placing an item in a search result, comprising:

at a search engine module, receiving a user search query from a user;

at the search engine module, generating a list of candidate query result items by querying with the user search query at an item database, the list of candidate query result items comprising the item;

at an item lookup module, calculating popularity scores for the candidate query result items by:
  performing a search on a set of popularity indices for mentions of each of the candidate query result items after a date of first introduction for each of the candidate query result items, the date of first introduction for each of the candidate query result items comprises a first offered for sale date for each of the candidate query result items;
  tabulating a quantity of the mentions of each of the candidate query result items; and
  calculating a quality of the mentions of each of the candidate query result items by analyzing context of the mentions of each of the candidate query result items to determine if the mentions of each of the candidate query result items comprise a positive indication;

at the item lookup module, calculating item nascency scores for the candidate query results items, the item nascency scores determined at least in part from the date of first introduction for each of the candidate query result items;

at the item lookup module, adjusting one of the popularity scores if a related one of the item nascency scores exceeds a nascency threshold;

from the search engine module, returning the search result to the user, the search result comprising a list of result items ranked by the popularity scores, the list of result items comprising the item and at least one of the candidate query result items;

determining item categories for the candidate query result items;

calculating category score adjustments for the candidate query result items;

adjusting the item nascency scores by the category score adjustments;

ranking the item in the search result in order of the popularity scores; and adjusting one of the popularity scores for the item by reviewing a popularity score of a related object, wherein:
the item comprises a product of a product database of a merchant;
the mentions of each of the candidate query result items reflect a number of times each of the candidate query result items has been purchased;
the set of popularity indices comprises at least one of:
Twitter;
Freebase; or
Facebook;
the related object comprises a prior version of the item; and
the nascency threshold is six months.

2. The method of claim 1, wherein the set of popularity indices comprises Twitter.

3. The method of claim 1, wherein the set of popularity indices comprises Freebase.

4. The method of claim 1, wherein the set of popularity indices comprises Facebook.

5. The method of claim 1, wherein the related object comprises an object that shares a category with the item.

6. The method of claim 1, wherein:
determining the item categories for the candidate query result items is performed at the item lookup module;
calculating the category score adjustments for the candidate query result items is performed at the item lookup module; and
adjusting the item nascency scores by the category score adjustments is performed at the item lookup module.

7. A computer-implemented method of placing an item in a search result, comprising:
at a search engine module, receiving a search query;
at the search engine module, identifying the item in the search query;
at an item lookup module, calculating an item popularity score for the item by:
performing a search on a set of popularity indices for mentions of the item after an item first introduction date for the item, the item first introduction date for the item comprises a first offered for sale date for the item;
tabulating a quantity of the mentions of the item; and
calculating a quality of the mentions of the item by analyzing context of the mentions of the item to determine if the mentions of the item comprise a positive indication;
at an item lookup module, searching an item database for the item first introduction date for the item;
at the item lookup module, calculating an item nascency score for the item;
at the item lookup module, if the item nascency score exceeds a nascency threshold, adjusting the item popularity score for the item;
at the search engine module, generating a list of search results, wherein the list of search results comprises the item and is ranked by item popularity scores;
transmitting the list of search results to a user;
determining an item category for the item;
calculating a category score adjustment for the item; and
adjusting the item nascency score by the category score adjustment;

ranking the item in the list of search results in order of the item popularity scores; and adjusting one of the item popularity scores for the item by reviewing an item popularity score of a related object, wherein:
the item comprises a product of a product database of a merchant;
the mentions of the item reflect a number of times the item has been purchased;
the set of popularity indices comprises at least one of:
Twitter;
Freebase; or
Facebook;
the related object comprises a prior version of the item; and
the nascency threshold is six months.

8. The method of claim 7, further comprising:
determining the item category for the item is performed at the item lookup module;
calculating the category score adjustment for the item is performed at the item lookup module; and
adjusting the item nascency score by the category score adjustment is performed at the item lookup module.

9. A system for placing an item in a search result comprising:
a search engine module adapted to receive a user search query and generate a search result list sorted by item popularity and comprising the item; and
an item lookup module adapted to:
perform a search on a set of popularity indices for mentions of the item after an item first introduction date for the item, the item first introduction date for the item comprising a first offered for sale date for the item, and modify an item popularity score for the item based on:
a quantity of the mentions of the item in the set of popularity indices; and
a quality of the mentions of the item in the set of popularity indices, the quality of the mentions of the item is determined by analyzing context of the mentions of the item to determine if the mentions of the item comprise a positive indication;
determine an item nascency score for the item from an item age for the item, the item age determined at least in part from the item first introduction date for the item;
compare the item nascency score to a nascency threshold;
if the item nascency score exceeds the nascency threshold, calculate a new item popularity score boost for the item;
apply the new item popularity score boost to the item popularity score for the item;
determining an item category for the item;
calculating a category score adjustment for the item; and
adjusting the item nascency score by the category score adjustment;
ranking the item in the search result based on the item popularity score; and
adjusting the item popularity score for the item by reviewing an item popularity score of a related object, wherein:
the item comprises a product of a product database of a merchant;

the mentions of the item reflect a number of times the item has been purchased;

the set of popularity indices comprises at least one of:
   Twitter;
   Freebase; or
   Facebook;

the related object comprises a prior version of the item; and the nascency threshold is six months.

10. The system of claim 9, wherein the set of popularity indices comprises Twitter.

11. The system of claim 9, wherein the set of popularity indices comprises Freebase.

12. The system of claim 9, wherein the set of popularity indices comprises Facebook.

* * * * *